US008340420B2

(12) United States Patent
Smith et al.

(10) Patent No.: US 8,340,420 B2
(45) Date of Patent: Dec. 25, 2012

(54) METHOD FOR RECOGNIZING OBJECTS IN IMAGES

(75) Inventors: Gregory C. Smith, Dashi Township, Taoyuan County (TW); Shana S. Smith, Taipei (TW)

(73) Assignee: National Taiwan University, Taipei (TW)

( * ) Notice: Subject to any disclaimer, the term of this patent is extended or adjusted under 35 U.S.C. 154(b) by 744 days.

(21) Appl. No.: 12/573,556

(22) Filed: Oct. 5, 2009

(65) Prior Publication Data

US 2011/0081081 A1    Apr. 7, 2011

(51) Int. Cl.
*G06K 9/00*    (2006.01)
*G06K 9/34*    (2006.01)

(52) U.S. Cl. ........................................ 382/170; 382/164
(58) Field of Classification Search .................. 382/164, 382/170, 174, 224
See application file for complete search history.

(56) References Cited

U.S. PATENT DOCUMENTS

| | | | |
|---|---|---|---|
| 5,923,788 A * | 7/1999 | Rao ................................ 382/275 |
| 5,926,564 A | 7/1999 | Kimura |
| 6,477,272 B1 | 11/2002 | Krumm et al. |
| 6,532,301 B1 | 3/2003 | Krumm et al. |
| 6,611,622 B1 | 8/2003 | Krumm |
| 6,801,638 B1 | 10/2004 | Janssen et al. |
| 6,813,545 B2 | 11/2004 | Stromme |
| 6,952,496 B2 | 10/2005 | Krumm |
| 7,020,329 B2 | 3/2006 | Prempraneerach et al. |
| 7,085,437 B2 * | 8/2006 | Nakajima et al. ............. 382/311 |
| 7,092,566 B2 | 8/2006 | Krumm |
| 7,689,016 B2 * | 3/2010 | Stoecker et al. .............. 382/128 |
| 2004/0151375 A1 * | 8/2004 | Kim et al. ...................... 382/181 |
| 2007/0003142 A1 * | 1/2007 | Simard et al. ................. 382/187 |
| 2009/0324075 A1 * | 12/2009 | Shiiyama ...................... 382/170 |

OTHER PUBLICATIONS

Palenichka et al. ("Structure-adaptive filtering based on polynomial regression modeling of image intensity," J. Electronic Imaging, 10(2), Apr. 2001, pp. 521-534).*
Amidror, I. ("Scattered data interpolation methods for electronic imaging systems: a survey," J. Electronic Imaging, 11(2), Apr. 2002, pp. 157-176).*

* cited by examiner

*Primary Examiner* — Yubin Hung
(74) *Attorney, Agent, or Firm* — Muncy, Geissler, Olds & Lowe, PLLC

(57) ABSTRACT

A method for recognizing objects in images is disclosed. The method of the present invention comprises the following steps. First, acquire a digital image. Then, select one or more objects from the image according to a certain characteristic. Next, generate an x-axis histogram and/or a y-axis histogram from the segmented image. Then, find the zeroes and maxima for the x-axis histogram and/or the y-axis histogram and use the polynomial regression analysis to determine the shape, shape and location of each of the objects in the segmented image according to the zeroes and maxima. If the two curves linking two zeroes and one maximum in the x-axis histogram and the y-axis histogram are two sloped line, the corresponding object may be determined to be a triangle. If each of the four curves linking two zeroes and two maxima is a line, the corresponding object may be determined to be a rectangle.

20 Claims, 9 Drawing Sheets

METHOD FOR RECOGNIZING OBJECTS IN IMAGES

BACKGROUND OF THE INVENTION

1. Field of the Invention

The invention generally relates to a method for recognizing objects in images. More particularly, the invention relates to a method by which the shape, size and position of an object may be accurately and swiftly determined.

2. Description of the Prior Art

The object recognition system in the prior art includes the following five steps: (1) Acquire an image by a still camera or a similar device (2) Segment the image (3) Extract objects from the segmented image (4) Abstract the extracted objects (5) Classify the abstract objects.

Captured input images are typically composed of color or gray-scale pixel data in digital format, arranged as two-dimensional matrices in the x (horizontal) and y (vertical) directions. Images may contain thousands or millions of individual pixels.

At the lowest level of abstraction (no abstraction at all), objects can be modeled as whole images and compared, pixel by pixel, against a raw input image stored in a pattern matching database. However, most object recognition systems use various methods for segmenting images and extracting, abstracting, and classifying image objects to improve recognition speed and/or accuracy (Krumm, U.S. Pat. No. 7,092,566).

In particular, color histograms have been used in various steps of the process, primarily to improve object recognition speed in color images.

In U.S. Pat. No. 7,020,329, Prempraneerach, et al., described of using color histograms to segment a color image into a plurality of regions by converting the image into a three-dimensional color space and then generating a color histogram for each dimension in the color space. Use the histograms to generate a plurality of connecting boxes in the three-dimensional color space and computing a normalized variance value for each connecting box to form clusters of connecting boxes. Map the segmented and clustered pixels back to the image domain to extract segmented regions from the image, and classifying clustered pixels in the image domain to recognize objects in the image, which correspond to areas of the image with consistent color characteristics. Recommended classifying methods include neural networks (with adaptive template matching), frequency-sensitive competitive learning, rival-penalized competitive learning and statistical classifiers.

Prempraneerach, et al., described the proposed clustering technique as more efficient than prior iterative clustering techniques. In addition, they report that the proposed segmentation method further reduces computation time by processing each pixel only once, to create the intensity, hue, and saturation histograms which are then used for clustering.

However, the segmentation method does not make use of prior information concerning known image color content and the color histograms which are created do not maintain geometry information. As a result, the method still requires a series of complex computations to complete the object recognition process. First, the input image is filtered with an edge preserving filter to smooth the color image and reduce discontinuities in the subsequently derived color histograms, then all of the pixels in the image are converted from RGB to LUV and LUV to IHS color space values using a set of eleven equations, IHS histograms are computed for all of the pixel data, the histograms are filtered to remove high frequency noise, and each histogram is searched for valleys to create connecting boxes (by convolving each histogram with a Gaussian kernel or Gaussian filter).

Clusters of connecting boxes are then formed by computing the normalized variance of pixel values within each connecting box and connecting boxes are linked into tree-like structures based upon normalized variance values. Connecting boxes which have local minimum normalized variance values serve as root nodes for each tree-like structure. The remaining connecting boxes are linked as branch nodes to root nodes using a steepest gradient descent algorithm.

For the method to work properly, homogeneous regions in the image must cluster into well defined intervals in the three histograms. However, in practice, actual image color variations may be difficult to distinguish from color variations that result from either noise or the nonlinear transformation from RGB to IHS color space.

In U.S. Pat. Nos. 7,092,566 and 6,952,496 and 6,611,622, Krumm describes using color histograms for both representing and classifying segmented regions in an input image. The described object recognition method first creates model histograms of objects to be recognized and then segments an input image to extract regions which likely correspond to the objects to be recognized, derives histograms from the segmented regions, and then compares the derived histograms with the stored model histograms. Similarity measures between input and model histograms that exceed a prescribed threshold indicate that an input object matches a model object. Matching input histograms may also be added to a database of model histograms for the given object.

The described method creates model and input image histograms by determining the actual RGB colors exhibited by the pixels in a model or input image region, dividing the overall range of actual pixel colors into a series of discrete color ranges or quantized color categories, assigning each pixel of the extracted model or input image region to the quantized color category into which the actual color of the pixel falls, and establishing a count of the number of pixels assigned to each quantized color category. In a preferred embodiment, RGB pixel values are quantized into 27 color categories. Input image and model histograms are compared by comparing the pixel counts from each quantized color category of the input image and model histograms. Model histograms must be derived from a prefatory image which is similar to input images from which objects are to be recognized. Regions of the image from which model histograms are derived are also used in subsequent input images for extracting objects to be recognized.

In a preferred embodiment, model images are segmented by analyzing a time sequence of images from the same imaging device, determining a static background image by identifying pixel values that do not change appreciably in the time sequence of images, producing a foreground image by subtracting the background image from a subsequent image, and segmenting the foreground image into object regions by identifying groups of smoothly varying pixel values.

However, the method is primarily useful for tracking known objects in a time sequence of images. In addition, the method still requires a significant amount of processing time for creating model histograms and comparing input image histograms to model histograms. The color histogram generation technique used does not preserve geometry, just an accounting of the number of image pixels of given colors. As a result, actual object shape, size, and location cannot be determined. Finally, similar histograms for different objects may lead to inaccurate object recognition results.

In U.S. Pat. Nos. 6,532,301 and 6,477,272, Krum, et al., describe using co-occurrence histograms to represent and identify the location of a modeled object in a search image.

The process starts by creating model images of the object and then computing a co-occurrence histogram (CH) for each of the model images. Model images are created by capturing sets of images of the object to be identified from viewpoints spaced at equal angles from each other around the object and at various distances. Co-occurrence histograms are computed by identifying every possible unique, non-ordered pair of pixels in the model image and generating counts of pairs of pixels which have colors that fall within the same color range and which are separated in distance by the same distance range.

Next, search windows, of prescribed size, are generated from overlapping portions of the search image, and a CH is computed for each of the search windows, using the technique and pixel color and distance ranges established for the model image co-occurrence histograms.

Finally, each model image CH is compared to each search window CH to assess their similarity. Every search window CH that matches a model image CH, as indicated by a similarity value which exceeds a threshold value, is designated as potentially containing the object to be recognized. The location of the recognized object is then determined to be within the single search area with the largest similarity measure, among all search areas designated as potentially containing the object to be recognized. The location of the recognized object can be further refined by iteratively moving the identified search area up, down, left, or right by one pixel location and then re-computing the search window CH and re-comparing the search window CH with each model CH, to find potentially higher similarity measures. The system and process requires that search window size, color ranges, and distance ranges be chosen before image searching begins.

Krum describes several advantages of the proposed method. In particular, Krum states that co-occurrence histograms are an effective way to represent objects for recognition in images. Keeping track of pairs of pixels, which have matching colors and a given distance between them, allows a variable amount of geometry information to be added to a regular color-only histogram. In turn, considering both color and geometry, allows the object recognition process to work in spite of confusing background clutter and moderate amounts of occlusion and object flexing.

However, creating a model image database for histogram matching takes a significant amount of time. Computing co-occurrence histograms by computing distance measures for every possible unique, non-ordered pair of pixels in both the model images and the search image is also computationally expensive.

In addition, the given abstract object representation contains no specific geometric information other than the distance between like-colored pixels in the model and search images. Information concerning actual object shape, size, and location is lost. The resulting object location determination is not precise, and subsequent iterative refinement of the determined location is computationally intensive.

Further, method parameters, such as search window size, affect object recognition accuracy, and images must be scaled to handle overall size differences between search and model images.

A useful and relatively well-defined application for object recognition systems is real-time traffic sign recognition from moving vehicles. In general, traffic sign systems must be capable of fast object extraction and accurate object classification.

In U.S. Pat. No. 6,801,638, Janssen, et al. describe a process and device for recognizing traffic signs and then displaying them as memory aids for an observer. Images are captured by an image sensor and analyzed and classified by classifiers implemented in an information processing unit. A synthetic image of a traffic sign is then generated, stored in a memory unit, and displayed by means of a display unit.

Input images are first searched, by color and/or spatial position, to determine areas which, with above average probability, could contain objects which are traffic signs. Objects are recognized within the determined areas by hierarchically and sequentially classifying the image areas by separate known characteristics of traffic signs, for example a correlation process to identify outer shape (circle or square) and inner symbols, with respect to stored characteristic data. The classifiers compare logical distance between input object characterizing data and typical characterizing data sets stored in a memory unit. Objects are recognized when comparison distances fall below set thresholds.

However, the classifiers, so designed, must be trained with several passes, to handle variations in image quality due to varying weather and light conditions. The described classifiers also depend upon correlations between input object shape data with shape data stored in a memory unit. In general, correlation-based classifiers can be imprecise and/or slow. Correlation depends upon training, consistency of the viewed environment, and/or quality of the stored shape data.

Improving stored shape data requires extensive training or a large stored database. In turn, a large stored database requires more processing time to complete correlations. As an example, circular and square objects appear as varying oval and rectangular shapes from different viewing angles, which could reduce object recognition accuracy.

The method described also depends upon searching the input image for areas which could contain traffic signs based upon color values and/or spatial position.

In U.S. Pat. No. 6,813,545, Stromme describes a system for reminding a driver of the presence of at least one particular traffic sign. The system consists of an imaging unit attached to the vehicle and directed toward the road ahead of the vehicle, a database which contains at least one pre-registered traffic sign shape, and an automatic recognition unit for detecting and identifying traffic signs, in successive images, by searching images areas which have a shape contained in the database, a selection process between two signs contained in the same image for determining the distance between the vehicle and the signs, and a sound and/or visual indicator which signals that an identified traffic sign is present on the road ahead of the vehicle.

Input images are captured periodically, based upon the speed of the vehicle. Each input image is analyzed in a shape recognition processor, to detect the presence of traffic sign shapes and traffic sign symbol shapes contained in the shape information database.

In a preferred embodiment, the shape search and recognition unit within the system uses conventional image processing methods: simple edge detection, such as Canny edge detection, followed by simple pixel-by-pixel matching across the processed image. Several views of the sign shapes are stored in the shape matching database. For triangles, circles, or rectangles, symbols contained within the sign are also identified, using pattern or recognition algorithms applied to the detected shape. Color detection is also carried out to check that a detected shape is effectively a traffic sign.

However, direct image searching methods and, in particular, edge detection and pixel-by-pixel pattern matching methods are generally imprecise and relatively slow. In addition, both sign and sign symbol shape and size vary significantly, based upon vehicle position with respect to a given traffic sign, which further hinders accurate shape matching and object recognition using edge detection and pixel-by-pixel matching.

In U.S. Pat. No. 5,926,564, Kimura uses histograms for object recognition. In his method, scanning is conducted along the x-axis and y-axis and "0-1 pattern" is used for comparison of images. The disadvantage of the method is the fact that the shape and size of an object can not be correctly calculated if there is a misalignment between an image capture device and the object.

From the above, we can see that the methods of the prior art have many disadvantages and need to be improved.

To eliminate the disadvantages of the methods of the prior art, the inventor has put in a lot of effort in the subject and has successfully come up with the method of the present invention.

SUMMARY OF THE INVENTION

A first object of the present invention is to provide a method in which zeroes and maxima are located in an x-axis (horizontal axis) histogram and/or a y-axis (vertical axis) histogram and the polynomial regression analysis is employed to swiftly determine the shape, size and location of each of the objects in the segmented image.

Another object of the present invention is to provide a method in which one or more objects are selected from the image according to a certain characteristic, which may be an RGB characteristic or a characteristic of grayscale or visible frequency spectrum and then the shape, size and location of each of the objects in the segmented image are swiftly determined so that the method may be used in the determination or recognition of traffic signs and in other fields.

To reach these objects, the method of the present invention is disclosed. The method of the present invention comprises the following eight steps:

Step 1: Acquire a digital image

Step 2: Select one or more objects from the image according to a certain characteristic, such as a color-specific characteristic (RGB or IHS color), a characteristic of grayscale and a spectrum-specific characteristic.

Step 3: Generate an x-axis (horizontal axis) histogram and/or a y-axis (vertical axis) histogram from the image of Step 2

Step 4: Locate the zeroes and maxima for the x-axis histogram and/or the y-axis histogram Step 5: Use the polynomial regression analysis to determine the shape of each of the objects according to the zeroes and maxima. If the two curves linking two zeroes and one maximum in the x-axis histogram or the y-axis histogram are two sloped line, the corresponding object may be determined to be a triangle. If each of the four curves linking two zeroes and two maxima in the x-axis histogram or the y-axis histogram is a line, the corresponding object may be determined to be a rectangle. If the relation between two zeroes and two maxima in the x-axis histogram or the y-axis histogram is in the form of a quadratic function, the corresponding object may be determined to be a circle or an ellipse.

Step 6: Use the distance between two zeroes in the x-axis histogram or the y-axis histogram to determine the size of the corresponding object Step 7: Use the coordinates (locations) of the zeroes in the x-axis histogram or the y-axis histogram to determine the location of the corresponding object.

Step 8: Select objects from the original image of Step 1 according to another characteristic to generate another image and then repeat Step 2 to 7 to process the new image.

DETAILED DESCRIPTION OF THE PREFERRED EMBODIMENTS

Please see FIG. 1, which illustrates the flowchart for the method of the present invention. The flowchart includes the following 8 steps.

Step 1: Acquire an image of digital pixel data by a digital image capture device. Alternatively, an analog image may first be acquired by an analog image capture device and such analog image may then be converted to a digital image, which is to be analyzed. Also, such digital image capture device or analog image capture device may be a digital/still camera, a video camera or other types of image capture devices 801.

Step 2: Select one or more objects from the image (segment the image) according to a certain color-specific characteristic of the image 802. In one embodiment, the image is a color image, and the image is segmented by a single color. In another embodiment, the image may be a grayscale image, and the image may be segmented by a known grayscale intensity value of an object to be recognized in the image. In another embodiment, the image may be of a visible frequency spectrum, and the image may be segmented by such visible frequency spectrum.

Step 3: Then, an X-axis (horizontal axis) histogram and/or a Y-axis (vertical axis) histogram 803 are calculated by counting the number of pixels in each column or each row of the segmented image that meets the segmentation criteria.

Step 4: Next, zeroes and maxima are located in the X-axis histogram and/or Y-axis histogram 804. Zeroes and maxima are located by conducting a linear search in the X-axis histogram and/or Y-axis histogram, and the locations (the numbers of column or row) of the zeroes and maxima are noted and recorded. Alternatively, other types of searching algorithms or methods may be employed to locate the zeroes and maxima in the X-axis histogram and/or Y-axis histogram.

Step 5: Use the polynomial regression analyses to determine the shape of an object according to the zeroes and maxima (805). If the two curves linking the two zeroes and the maximum in the X-axis histogram and the Y-axis histogram are two sloped line, the corresponding object may be determined to be a triangle. If each of the four curves linking the two zeroes and the two maxima in the X-axis histogram and the Y-axis histogram is a line, the corresponding object may be determined to be a rectangle. If the relation between the two zeroes and the two maxima in the X-axis histogram and the Y-axis histogram is in the form of a quadratic function, the corresponding object may be determined to be a circle or an ellipse.

Step 6: Determine the numbers of pixels in the X axis and Y axis from the X-axis histogram and the Y-axis histogram and the locations of the zeroes and the maxima. Then, object size may be accurately calculated (806).

Step 7: Determine the location of the object according to the X-axis histogram and Y-axis histogram and the locations of zeroes (807).

Step 8: Repeat from Step 2 to step 7 according to a different characteristic. In this manner, an image may be processed several times according to a plurality of characteristics. Therefore, the goal of accurate and fast determination of the shape, size and location of an object may be achieved.

Now, please refer to FIGS. 2 to 5, which illustrate the first embodiment of the method of the present invention. The first embodiment includes the following 8 steps.

Step 1: As illustrated in FIG. 2, a digital color image which contains five objects (a red triangle 1, a red circle 2, a red rectangle 3, a green triangle 4 and a blue rectangle 5) are shown. Such image may be generated by a computer or a digital or analog image capture device.

Step 2: As illustrated in FIG. 3, only red objects (the red triangle 1, red circle 2 and red rectangle 3) are kept and objects of other colors (the green triangle 4 and blue rectangle 5) are removed during the segmentation process.

Step 3: Calculate the X-axis histogram and Y-axis histogram. As illustrated in FIG. 4, the number of red (non-black) pixels in each column in the segmented image of FIG. 3 is counted to obtain the X-axis histogram. In FIG. 4, the triangular FIG. 101, curved FIG. 201 and rectangular FIG. 301 correspond to the red triangle 1, red circle 2 and red rectangle 3, respectively, in FIG. 3. In FIG. 4, the horizontal axis represents column number and the vertical axis represents the number of pixels. Such X-axis histogram figure contains enough information to determine the shape, size and location of each object appearing in the original input image in the horizontal direction. As illustrated in FIG. 5, the number of red (non-black) pixels in each row in the segmented image of FIG. 3 is counted to obtain the Y-axis histogram. In FIG. 5, the triangular FIG. 102, curved FIG. 202 and rectangular FIG. 302 correspond to the red triangle 1, red circle 2 and red rectangle 3, respectively, in FIG. 3. In FIG. 5, the horizontal axis represents row number and the vertical axis represents the number of pixels. Such Y-axis histogram figure contains enough information to determine the shape, size and location of each object appearing in the original input image in the vertical direction.

Step 4: Zeroes and maxima are located within the X-axis and Y-axis histograms. As illustrated in FIG. 4, a linear search is employed to locate the two zeroes and one maximum and the locations in terms of column number of these three points are noted and recorded. In FIG. 4, with regard to the triangular FIG. 101, the two zeroes have the height of zero pixel; the first zero A is located at the $50^{th}$ column and the second zero C is located at the $170^{th}$ column; also, the maximum B has the height of 85 pixels. Then, the four zeroes D, F, G and J and the three maxima E, H and I are located for the curved FIG. 201 and rectangular FIG. 301. The four zeroes D, F, G and J occur at the $273^{rd}$, $362^{nd}$, $498^{th}$ and $563^{rd}$ columns, respectively. While, the three maxima E, H and I have the same height 86. In the same manner, in FIG. 5, the six zeroes and four maxima are located for the triangular FIG. 102, curved FIG. 202 and rectangular FIG. 302. With regard to the triangular FIG. 102, the two zeroes K and M occur at the $50^{th}$ and $136^{th}$ row and the maximum L has the height of 119 pixels. With regard to the curved FIG. 202, the two zeroes N and P occur at the $160^{th}$ and $245^{th}$ row, respectively, and the maximum 0 has the height of 88 pixels. With regard to the rectangular FIG. 302, the two zeroes Q and T occur at the $280^{th}$ and $365^{th}$ row, respectively, and the two maxima R and S have the same height of 65 pixels.

Step 5: Use the polynomial regression analyses to determine the shape of an object according to the zeroes and maxima (805). As illustrated in FIG. 4, with regard to the triangular FIG. 101, two straight lines 1011 and 1012 may be determined according to the two zeroes and one maximum. In the same manner, with regard to the curved FIG. 201, a curve 2011 may be determined; with regard to the rectangular FIG. 301, three straight lines 3011, 3012 and 3013 may be determined.

After we conduct the polynomial regression analysis for the curve 1011 of the object 101 in FIG. 4, we obtain:

Degree 1: $-70.28+1.398x$, $\alpha=0.05$, $p<0.0001$, $p<0.0001$, $R^2=1.00$;

Degree 2: $-70.71+1.41x-7.0424e-5x^2$, $\alpha=0.05$, $p<0.0001$, $p<0.0001$, $p=0.6085$, $R^2=1.00$;

Therefore, it is very likely that the curve 1011 is a straight line with the slope of 1.398 and the result of degree 2 is statistically insignificant at $\alpha=0.05$.

After we conduct the polynomial regression analysis for the other curve 1012 of the triangular FIG. 101 in FIG. 4, we obtain:

Degree 1: $237.2-1.398x$, $\alpha=0.05$, $p<0.0001$, $p<0.0001$, $R^2=1.00$

Degree 2: $238.5-1.418x+7.0424e-5x^2$, $\alpha=0.05$, $p<0.0001$, $p<0.0001$, $p=0.6085$, $R^2=1.00$ Therefore, it is very likely that the curve 1011 is a straight line with the slope of 1.398 and the result of degree 2 is statistically insignificant at $\alpha=0.05$.

Consequently, we can determine that the first object 101 in FIG. 4 is a red triangle.

Then, after we conduct the polynomial regression analysis for the curve 2011 of the object 201 in FIG. 4, we obtain:

Degree 1: $48.71+0.05037x$, $\alpha=0.05$, $p=0.0784$, $p=0.5589$, $R^2=0.00$;

Degree 2: $-3331+21.48x-0.03375x^2$, $\alpha=0.05$, $p<0.0001$, $p<0.0001$, $p<0.0001$, $R^2=0.95$;

Therefore, it is very likely that the object 201 is a circle or an ellipse and the result of degree 2 is statistically significant at $\alpha=0.05$.

Consequently, we can determine that the second object 201 in FIG. 4 is a red circle.

Next, with regard to the object 301, because the three curves 3011, 3012 and 3013 are vertical or horizontal straight lines, the polynomial regression analysis can not be conducted. Moreover, because the lines 3011 and 3013 represents the line linking an zero with a maximum and the line 3012 represents the line linking the two maxima, we conclude that the object 301 is a red rectangle 3.

Step 6: After we determine the shapes of these objects, we proceed to determine the sizes of them. With regard to the triangular FIG. 101 in FIG. 4, we have obtained that the two zeroes A and C occur at the $50^{th}$ and $170^{th}$ column and the maximum B has the height of 85 pixels, and hence the actual size of the red triangle 1 may be calculated from the characteristics of the camera and images and the location of the camera.

With regard to the curved FIG. 201 in FIG. 4, we have obtained that the two zeroes D and F occur at the $273^{rd}$ and $362^{nd}$ column and the maximum E has the height of 86 pixels, and hence the actual size of the red circle 2 in FIG. 2 may be calculated from the characteristics of the camera and images and the location of the camera.

With regard to the rectangular FIG. 301 in FIG. 4, we have obtained that the two zeroes G and J occur at the $498^{th}$ and $563^{rd}$ column and both of the two maxima H and I have the same height of 86 pixels, and hence the actual size of the red triangle 3 in FIG. 2 may be calculated from the characteristics of the camera and images and the location of the camera.

Step 7: Now, we calculate the location of each of these objects. Please refer to FIGS. 4 and 5. We have obtained six zeroes (A, C, D, F, G and J) in FIG. 4 and six zeroes (K, M, N, P, Q and T) in FIG. 5. With regard to the triangular FIG. 101 in FIG. 4, we have obtained that the two zeroes A and C occur at the $50^{th}$ and $170^{th}$ column in the X-axis of FIG. 3 and that the two zeroes K and M occur at the $52^{nd}$ and $136^{th}$ row in the Y-axis of FIG. 3. Therefore, the location of the red triangle 1 may be obtained.

With regard to the curved FIG. 201 in FIG. 4, we have obtained that the two zeroes D and F occur at the $273^{rd}$ and $362^{nd}$ column in the X-axis of FIG. 3 and that the two zeroes N and P occur at the $160^{th}$ and $245^{th}$ row in the Y-axis of FIG. 3. Therefore, the location of the red circle 2 may be obtained.

With regard to the rectangular FIG. 301 in FIG. 4, we have obtained that the two zeroes G and J occur at the $498^{th}$ and $563^{rd}$ column in the X-axis of FIG. 3 and that the two zeroes Q and T occur at the $280^{th}$ and $365^{th}$ row in the Y-axis of FIG. 3. Therefore, the location of the red rectangle 3 may be obtained.

The actual size of each the objects in FIG. 3 may be calculated from the characteristics of the camera and images and the location of the camera.

Step 8: Repeat step 2 to 7 to obtain the shape, size and location of the green object or the blue object.

In comparison to the methods of the prior art, the method of the present invention may be carried out without any pattern matching database and pattern matching; therefore, the method of the present invention is faster and more accurate in object recognition. In addition, object shape information is derived using the polynomial regression analysis, which also provides a measure of shape recognition accuracy, based upon $R^2$ fit values. Moreover, objects are located without direct input image searching, which is inaccurate and time-consuming.

Now, please refer to FIGS. 6 to 9 for the second embodiment of the method of the present invention. The second embodiment of the method of the present invention is mainly used in the recognition of traffic signs and includes the following steps:

Step 1: As illustrated in FIG. 6, an image is acquired by an image capture device. The image contains a traffic sign 6. The traffic sign includes a red outer ring 61, white inside 62 and a black number 63. In addition, the image has other red objects, such as the red flowers 71 of the tree and the red blossoms 71 of the bushes. Some of the red flowers 71 are blocked by the green leaves.

Step 2: As illustrated in FIG. 7, only the red objects (the red outer ring 61, the red flowers 71 of the tree and the red blossoms 71 of the bushes) are chosen and objects in other colors are removed in the segmentation process.

Step 3: The number of red pixels in each column and row in the segmented image of FIG. 7 is counted to obtain the X-axis histogram (FIG. 8) and the Y-axis histogram (FIG. 9), respectively. Either FIG. 8 or 9 contains a centrally concave pattern 501 (which corresponds to the outer ring 61), a red flower pattern 502 and a red blossom pattern 503, which corresponds to the blossoms 71 of the bushes. In FIG. 8, we can see that the centrally concave pattern 501 has a distinctive shape and does not overlap with the other two patterns 502 and 503. While, in FIG. 9, the outer ring 61 and the red flowers 71 overlap in the vertical axis of FIG. 7 and the latter is considered as noise because the former is what we are aiming for. Similarly, in FIG. 9, the centrally concave pattern 501 has a distinctive shape.

Step 4: Scanning is carried from the $0^{th}$ column to the $3264^{th}$ column and from the $0^{th}$ row to the $3264^{th}$ row in FIG. 7 to obtain FIGS. 8 and 9. With regard to the centrally concave pattern 501, two zeroes A' and D' and two maxima B' and C' are located in FIG. 8 and two zeroes E' and H' and two maxima F' and G' are located in FIG. 9; also, the four zeroes A', D', E' and H' occur at the $1112^{th}$ column, $2040^{th}$ column, $1099^{th}$ row and $2078^{th}$ row, respectively; moreover, both of two maxima B' and C' have the same height of 710 pixels, and the two maxima F' and G' have the height of 660 and 650 pixels, respectively. In addition, the method used to search for the four zeroes A', D', E' and H' and the four maxima B', C', F' and G' is the same with the one used for FIGS. 4 and 5.

Step 5: Then, we conduct the polynomial regression analysis for the three curves 5011, 5012 and 5013 in FIG. 8 to determine the shape of the object.

The result for the curve 5011 from the polynomial regression analysis is:

Degree 1: $-4439+4.145x$, $\alpha=0.05$, $p<0.0001$, $p<0.0001$, $R^2=0.93$

Degree 2: $-42765+68.91x-0.02733x^2$, $\alpha=0.05$, $p<0.0001$, $p<0.0001$, $p=0.0001$, $R^2=0.99$ Therefore, it is very likely that the curve 5011 corresponds to a part of a circle or an ellipse and the result of degree 2 is statistically significant at $\alpha=0.05$.

The result for the curve 5012 of FIG. 8 from the polynomial regression analysis is:

Degree 1: $352.3+0.008745x$, $\alpha=0.05$, $p<0.0001$, $p=0.6111$, $R^2=0.00$

Degree 2: $6456-7.861x+0.002503x^2$, $\alpha=0.05$, $p<0.0001$, $p<0.0001$, $p<0.0001$, $R^2=0.89$ Therefore, it is very likely that the curve 5012 corresponds to a part of a circle or an ellipse and the result of degree 2 is statistically significant at $\alpha=0.05$.

The result for the curve 5013 of FIG. 8 from the polynomial regression analysis is:

Degree 1: $9155-4.43x$, $\alpha=0.05$, $p<0.0001$, $p<0.0001$, $R^2=0.92$ Degree 2: $-102241+109x-0.02887x^2$, $\alpha=0.05$, $p<0.0001$, $p<0.0001$, $p=0.0001$, $R^2=0.99$ Therefore, it is very likely that the curve 5013 corresponds to a part of a circle or an ellipse and the result of degree 2 is statistically significant at $\alpha=0.05$.

From the above, we can determine that the centrally concave pattern 501 of FIG. 8 is a circle or an ellipse.

Step 6: After we determine the shape of the object, we proceed to determine its size. As illustrated in FIG. 8, the two zeroes A' and D' occur at the $1112^{th}$ and $2040^{th}$ column and the two maxima B' and C' has the same height of 710 pixels. While in FIG. 9, the two zeroes E' and H' occur at the $1099^{th}$ and $2078^{th}$ row and the maximum F' and G' have the height of 660 pixels and 650 pixels, respectively. Therefore, the actual size of the object may be calculated from these data as well as the characteristics of the camera and images and the location of the camera.

Step 7: Now, we calculate the location of the object. With the locations of the four zeroes A', D', E' and H' (please see FIGS. 8 and 9), we can calculate the location of the object in the same manner as previously described.

Step 8: Repeat step 2 to 7 to obtain the shape, size and location of each of the objects selected according to other characteristic(s).

The method of the present invention may be used to obtain the color, shape, size and location of an object. In addition, the method may be used for the recognition of traffic signs and in other fields.

With regard to the red flower pattern 502 in FIG. 8, such pattern does not have well-defined boundary because the $R^2$ values of degree 1 and degree 2 are relatively small in the result of the polynomial regression analysis:

Degree 1: $-1653+0.5543x$, $\alpha=0.05$, $p<0.0001$, $p<0.0001$, $R^2=0.48$

Degree 2: $-155477+102x-0.01672x^2$, $\alpha=0.05$, $p<0.0001$, $p<0.0001$, $p=0.0001$, $R^2=0.66$ Therefore, the red flower pattern 502 does not correspond to a circular or linear traffic sign.

In addition, noises would not affect the outcome of the polynomial regression analysis. The result for the curve 5014 of FIG. 9 from the polynomial regression analysis is:

Degree 1: 393−0.02945x, α=0.05, p<0.0001, p=0.0370, R^2=0.01

Degree 2: 5350−6.353x+0.001987x^2, α=0.05, p<0.0001, p<0.0001, p<0.0001, R^2=0.9

Therefore, it is very likely that the curve 5014 corresponds to a part of a circle or an ellipse and the result of degree 2 is statistically significant at α=0.05. This matches what we obtain for the curve 5012 of FIG. 8. Consequently, the noise (the red flowers 71 of the tree) does not affect the outcome in the recognition of the object in FIG. 9.

In comparison to the methods of prior art, the method of the present invention has the following two advantages:

1. First, zeroes and maxima are obtained in the x-axis and y-axis histograms. Then, the polynomial regression analysis is conducted. Therefore, the shape, size and location of an object in an image may be swiftly and fast determined.

2. Objects may be selected or segmented according to one of a variety of characteristics, such as a color-specific characteristic (RGB or IHS color), a characteristic of grayscale (intensity) and a characteristic of visible frequency spectrum. In addition, the shape, size and location of each of the objects selected may be swiftly and accurately calculated and determined. In addition, the method may be used in the recognition of traffic signs and in other fields.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

From the above, we can see that the method of the present invention meets the relevant patent requirements. It is hoped that the patent application will be approved.

List of reference numerals

Figure 1:
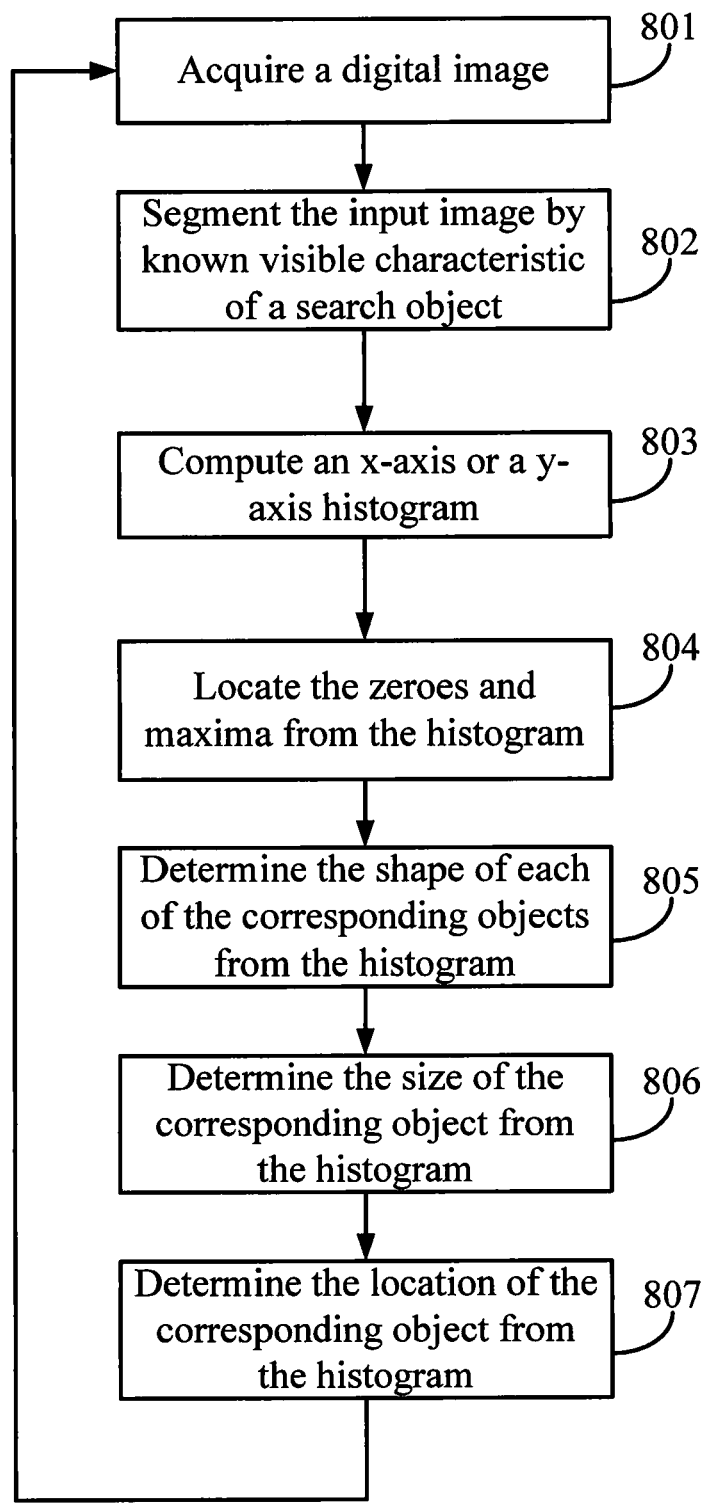
FIG. 1 is a flowchart including 8 steps for the method of the present invention.
Figure 2:
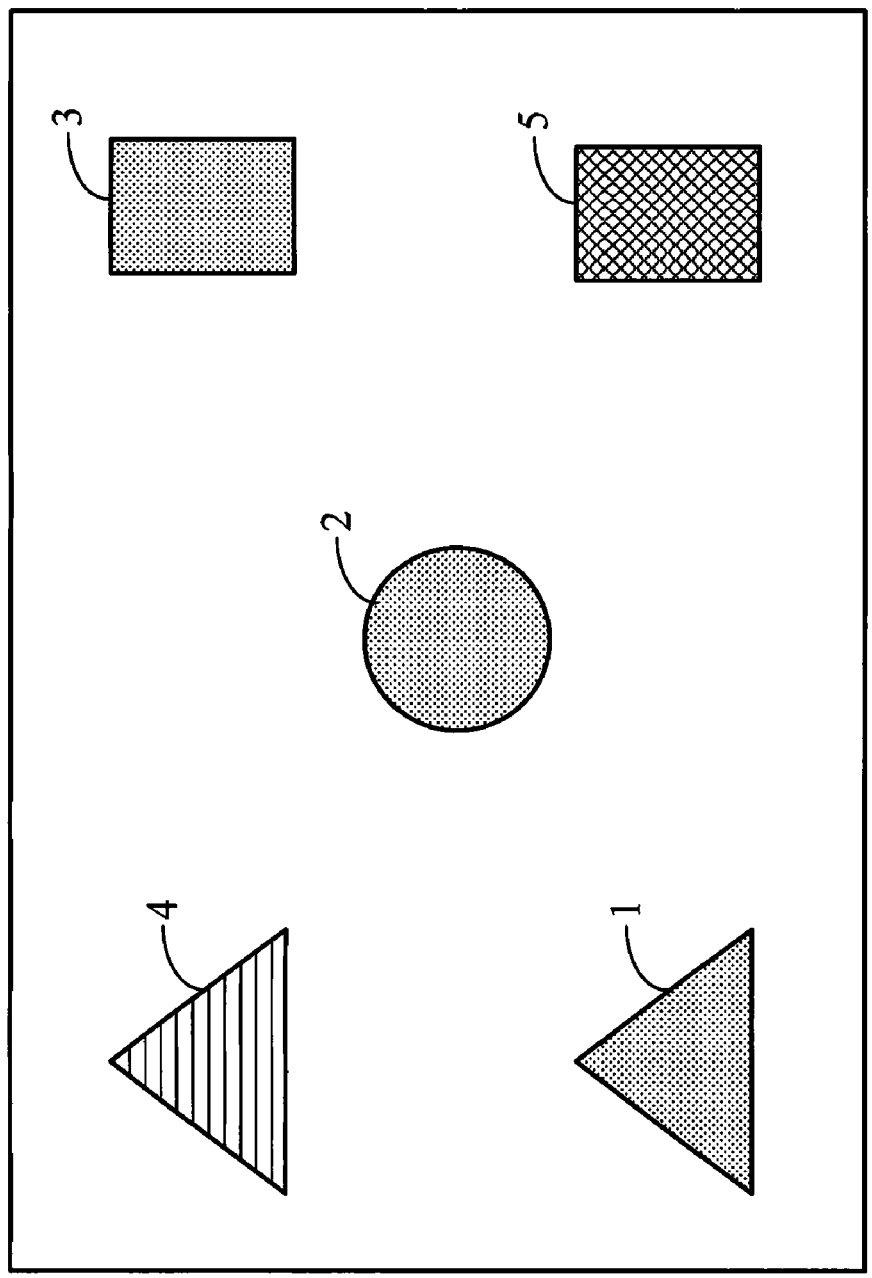
FIG. 2 is an image containing five objects in the first embodiment of the present invention.
Figure 3:
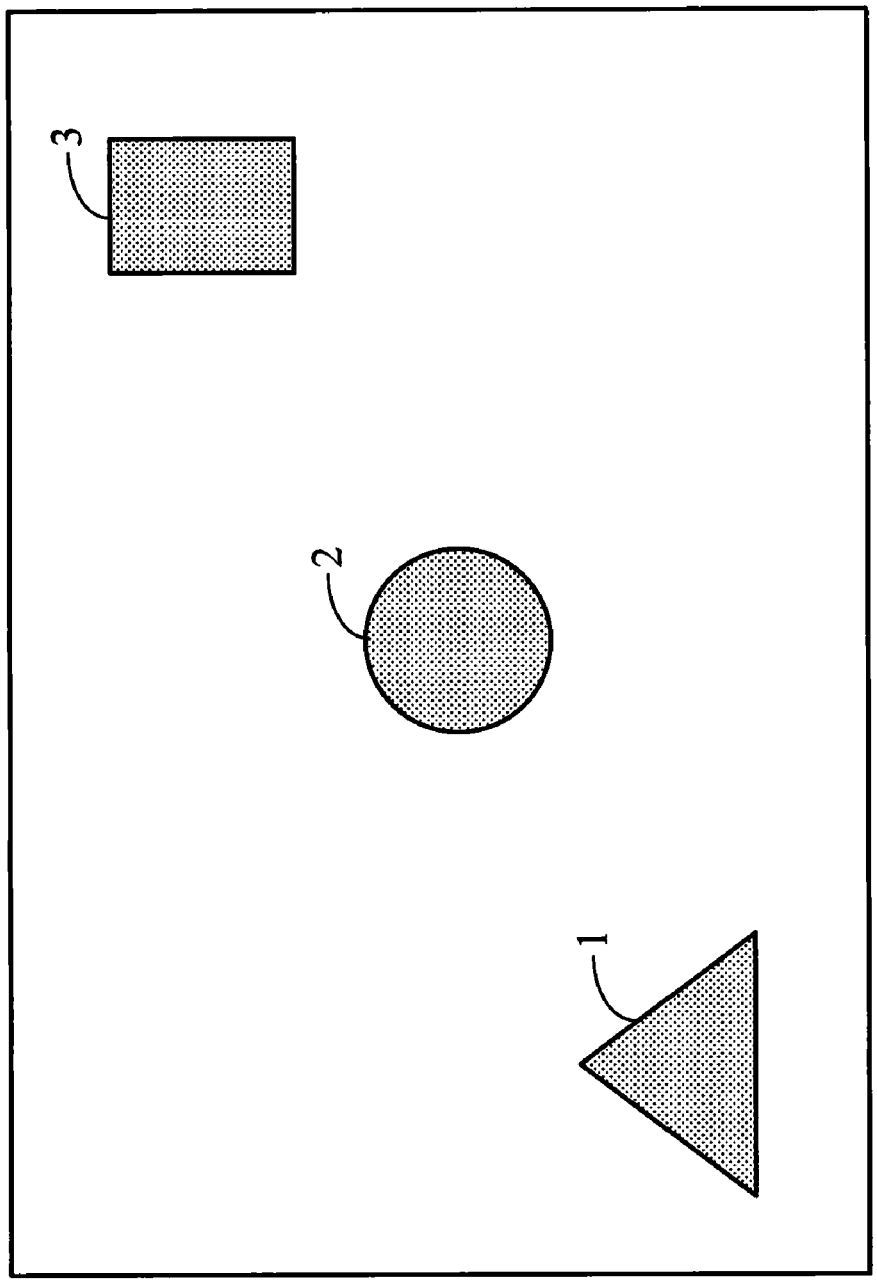
FIG. 3 is a segmented image of FIG. 2 (only the red objects are kept).
Figure 4:
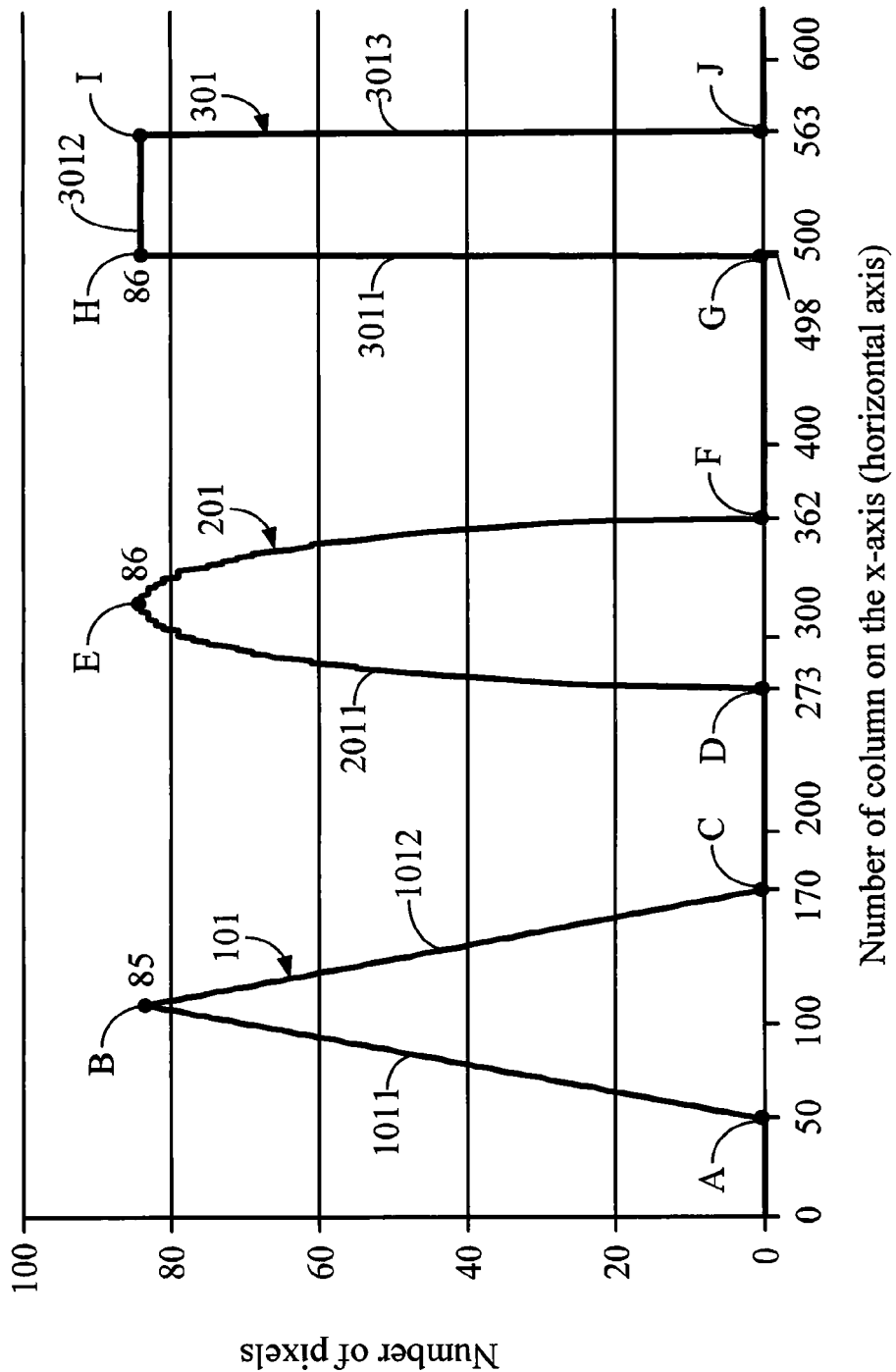
FIG. 4 is an x-axis histogram for FIG. 3 by counting the number of red pixels in each column in the x-axis of FIG. 3.
Figure 5:
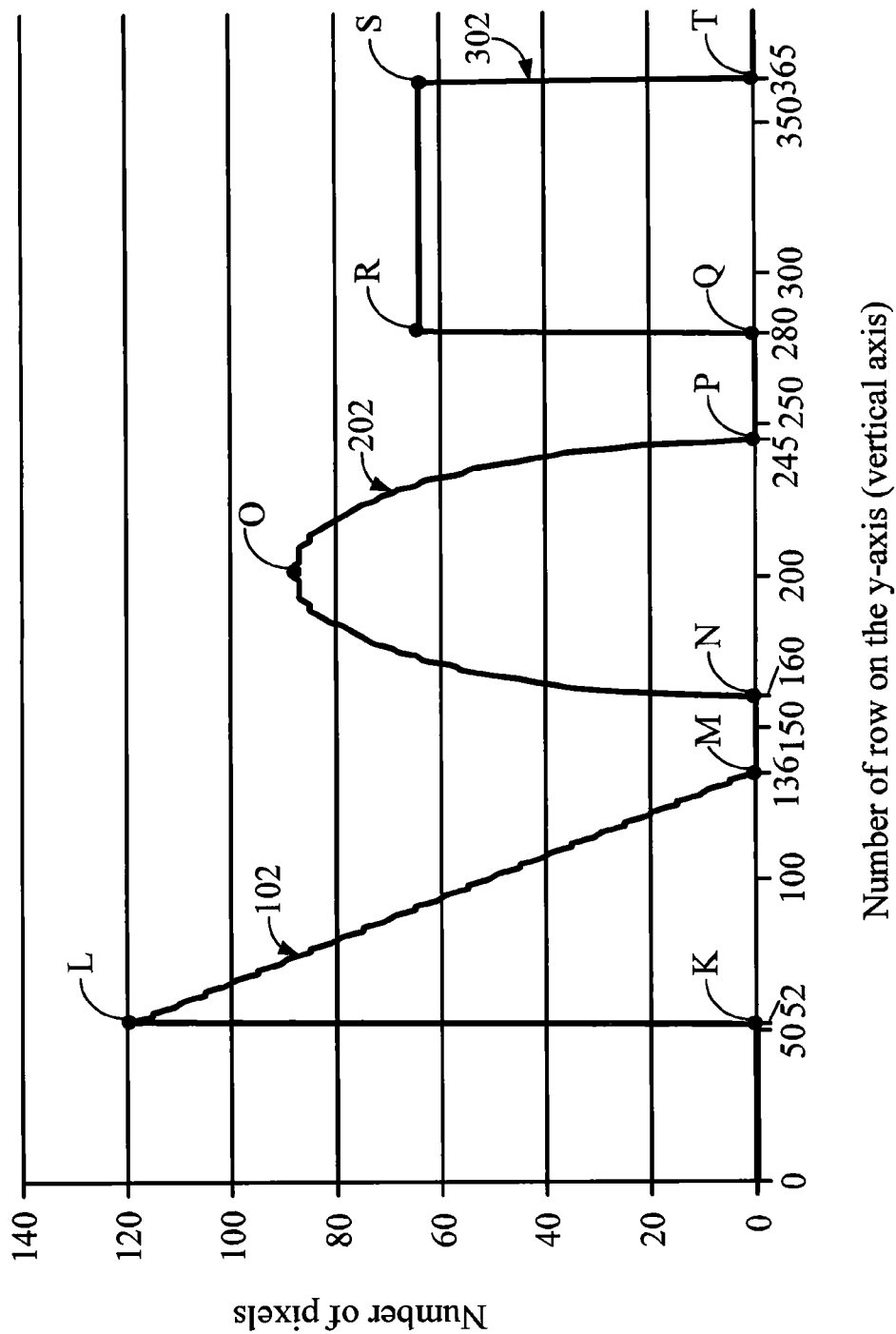
FIG. 5 is a y-axis histogram for FIG. 3 by counting the number of red pixels in each row in the y-axis of FIG. 3.
Figure 6:
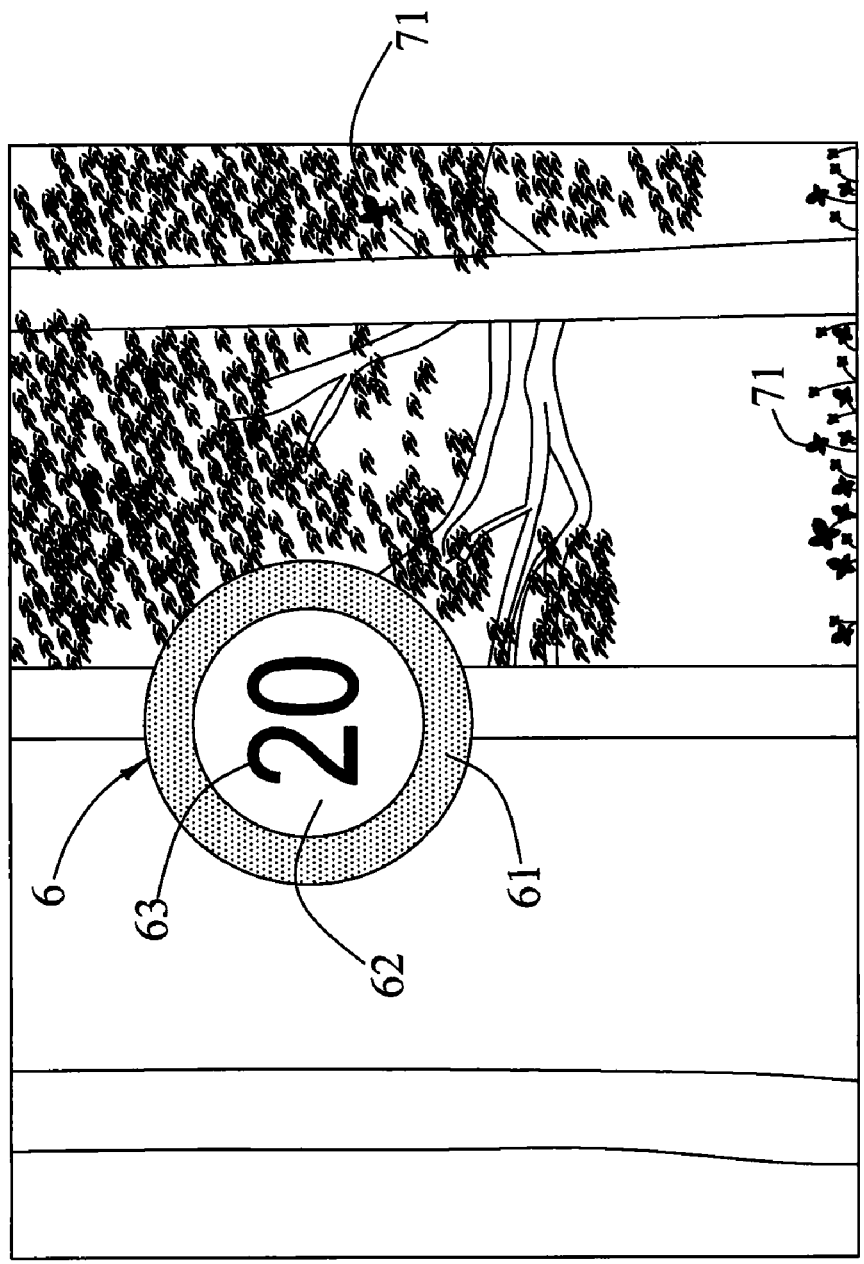
FIG. 6 is a color image containing several objects for the second embodiment of the present invention.
Figure 7:
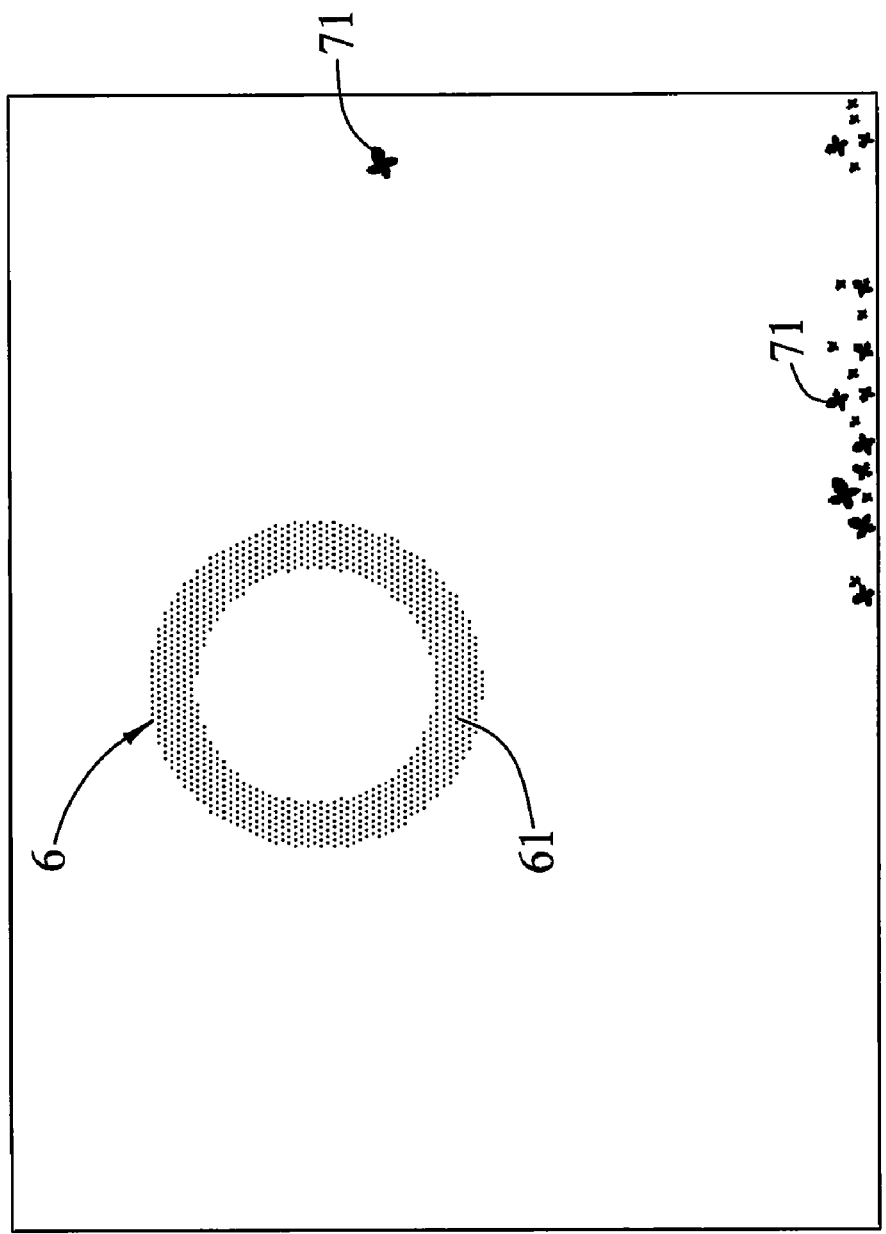
FIG. 7 is a segmented image of FIG. 6 (containing only the red objects).
Figure 8:
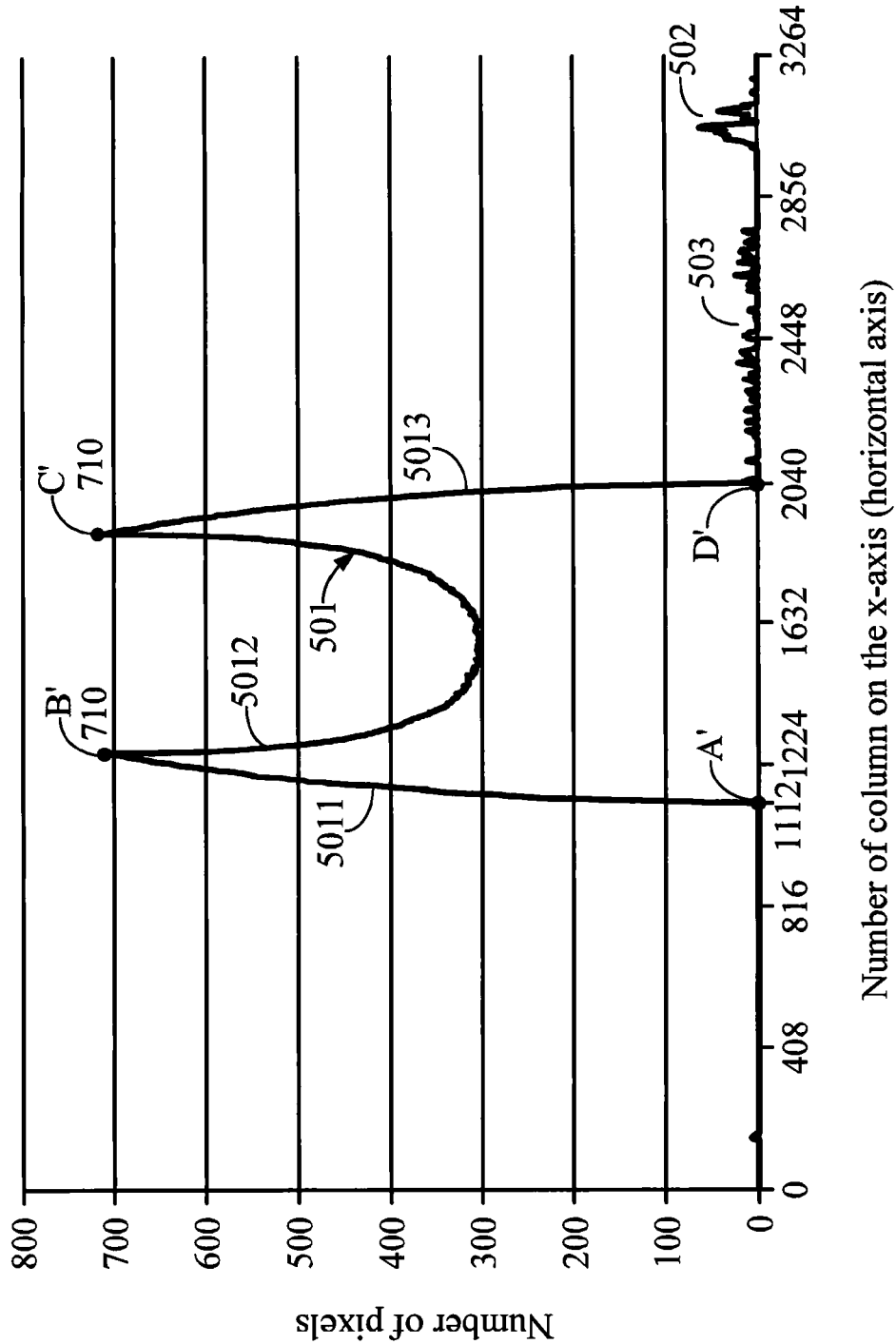
FIG. 8 is an x-axis histogram for FIG. 6 by counting the number of red pixels in each column along the x-axis of FIG. 6.
Figure 9:
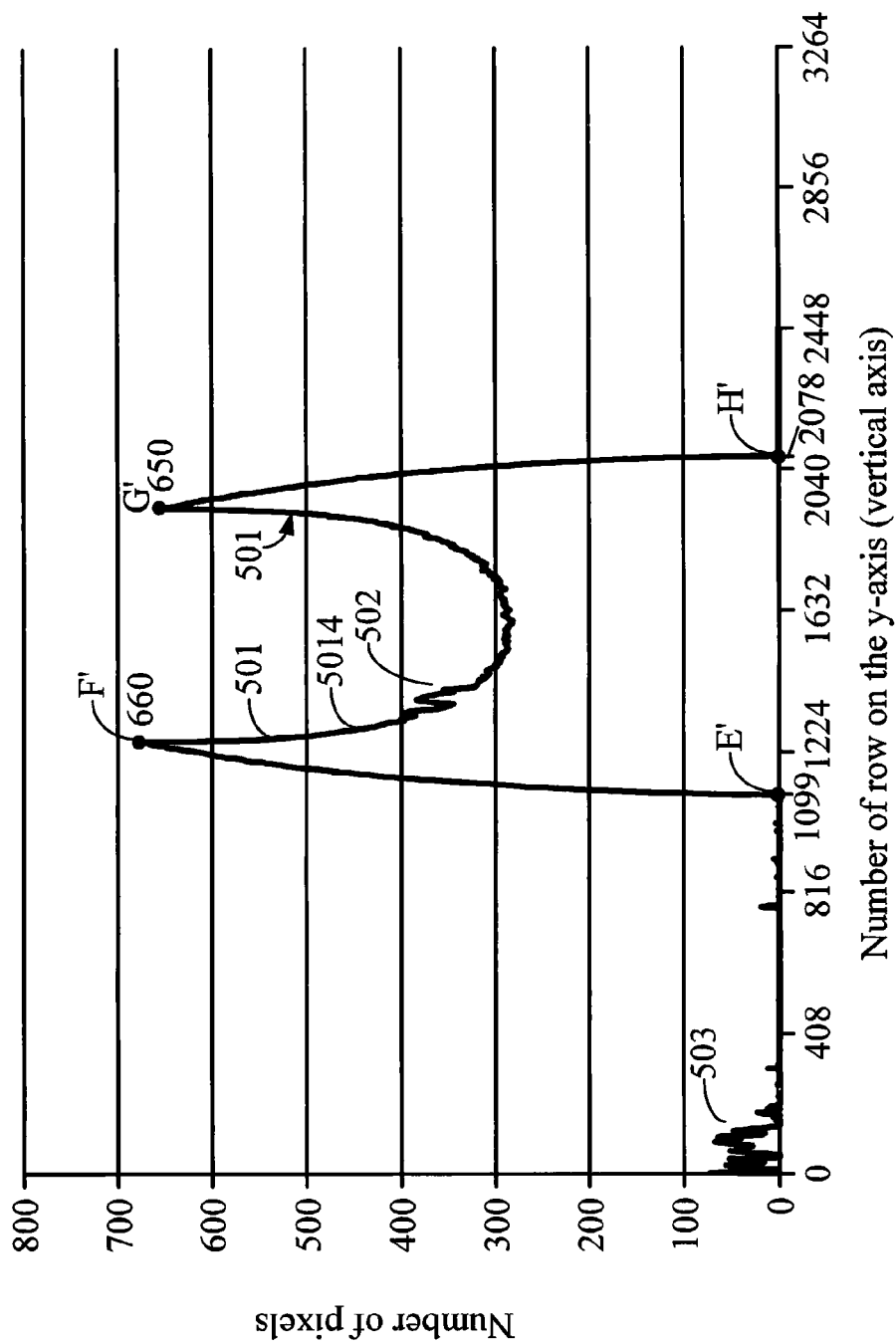
FIG. 9 is a y-axis histogram for FIG. 6 by counting the number of red pixels in each row along the y-axis of FIG. 6.

| | |
|---|---|
| 1 Red triangle | 2 Red circle |
| 3 Red rectangle | 4 Green triangle |
| 5 Blue rectangle | 6 Traffic sign |
| 61 Red outer ring | 62 White inside |
| 63 Black number | 71 Red flowers |
| 101 Triangular figure | 1011 Curve/straight line |
| 1012 Curve/straight line | 102 Triangular figure |

List of reference numerals (continued)

| | |
|---|---|
| 201 Curved figure | 2011 Curve |
| 202 Curved figure | 301 Rectangular figure |
| 3011 Curve/line | 3012 Curve/line |
| 3013 Curve/line | 302 Rectangular figure |
| 501 Centrally concave pattern | 5011 Curve |
| 5012 Curve | 5013 Curve |
| 5014 Curve | 502 Red flower pattern |
| 503 Red blossom pattern | A, C, D, F, G and J Zeroes |
| B, E, H and I Maxima | K, M, N, P, Q and T Zeroes |
| L, O, R, S Maxima | A', D', E' and H' Zeroes |
| B', C', F' and G' Maxima | |

What is claimed is:

1. A method for recognizing objects in images, comprising steps of:
  (a) Acquire a digital image;
  (b) Select one or more objects from the image according to a certain characteristic;
  (c) Generate an x-axis (horizontal axis) histogram and/or a y-axis (vertical axis) histogram from the image of Step (b);
  (d) Find or locate the zeroes and maxima for the x-axis histogram and/or the y-axis histogram;
  (e) Use the polynomial regression analysis to determine the shape of each of the objects according to the zeroes and maxima.

2. The method as in claim 1, further comprises:
  (a) Select objects from the original image of Step (a) according to another characteristic to generate another image and then repeat Step (b) to (e) to process the new image.

3. The method as in claim 1, further comprises:
  (a) Use the coordinates (locations) of the zeroes and maxima to determine the size of the corresponding object.

4. The method as in claim 1, further comprises:
  (a) Use the coordinates (locations) of the zeroes and maxima to determine the location of the corresponding object.

5. The method as in claim 1, wherein the digital image of Step (a) is acquired by a digital image capture device.

6. The method as in claim 5, wherein the digital image capture device is a still camera or a video camera.

7. The method as in claim 1, wherein, in Step (a), an analog image is first acquired by an analog image capture device and such analog image is then converted to a digital image.

8. The method as in claim 7, wherein the analog image capture device is a still camera, a video camera or other types of image capture devices.

9. The method as in claim 1, wherein, in Step (b), the characteristic is an RGB or IHS color characteristic.

10. The method as in claim 1, wherein, in Step (b), the characteristic is a characteristic of grayscale.

11. The method as in claim 1, wherein, in Step (b), the characteristic is a characteristic of visible frequency spectrum.

12. The method as in claim 1, wherein, in Step (c), the x-axis histogram and the y-axis histogram are generated by counting the number of pixels in each column and each row, respectively, of the segmented image of Step (b).

13. The method as in claim 1, wherein, in Step (d), the zeroes (the points with the height of zero pixel) are located by conducting a linear search in the x-axis histogram and/or the y-axis histogram.

14. The method as in claim 1, wherein, in Step (d), the maxima (the points with the maximal height) are located by conducting a linear search in the x-axis histogram and/or the y-axis histogram.

15. The method as in claim 1, wherein, in Step (d), the coordinates (locations) of the zeroes and maxima are noted and recorded.

16. The method as in claim 1, wherein, in Step (e), in the use of the polynomial regression analysis, if the two curves linking two zeroes and one maximum in the x-axis histogram or the y-axis histogram are two sloped line, the corresponding object may be determined to be a triangle.

17. The method as in claim 15, wherein, if the four curves linking two zeroes and two maxima in the x-axis histogram or the y-axis histogram are a straight line, the corresponding object may be determined to be a rectangle.

18. The method as in claim 15, wherein, if the relation between two zeroes and two maxima in the x-axis histogram or the y-axis histogram is in the form of a quadratic function, the corresponding object may be determined to be a circle or an ellipse.

19. A method for recognizing objects in images, comprising the following steps:
   (a) Acquire a digital image;
   (b) Select one or more objects from the image according to a certain characteristic;
   (c) Generate an x-axis histogram and/or a y-axis histogram from the image of Step (b);
   (d) Find or locate the zeroes and maxima for the x-axis histogram and/or the y-axis histogram;
   (e) Use the polynomial regression analysis to determine the shape of each of the objects according to the zeroes and maxima;
   (f) Use the coordinates (locations) of the zeroes and maxima to determine the size of the corresponding object.

20. A method for recognizing objects in images, comprising the following steps:
   (a) Acquire a digital image;
   (b) Select one or more objects from the image according to a certain characteristic;
   (c) Generate an x-axis histogram and/or a y-axis histogram from the image of Step (b)
   (d) Find or locate the zeroes and maxima for the x-axis histogram and/or the y-axis histogram;
   (e) Use the polynomial regression analysis to determine the shape of each of the objects according to the zeroes and maxima;
   (f) Use the coordinates (locations) of the zeroes and maxima to determine the size of the corresponding object;
   (g) Use the coordinates (locations) of the zeroes and maxima to determine the location of the corresponding object.

* * * * *